United States Patent
Schubert et al.

(10) Patent No.: US 7,231,282 B2
(45) Date of Patent: Jun. 12, 2007

(54) DEVICE AND METHOD FOR A FUNCTIONAL TEST OF ONE WIND TURBINE GENERATOR PLANT

(75) Inventors: Thomas Schubert, Ellerau (DE); Robert Hester, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 11/274,724

(22) Filed: Nov. 15, 2005

(65) Prior Publication Data

US 2006/0113801 A1 Jun. 1, 2006

(30) Foreign Application Priority Data

Nov. 17, 2004 (DE) ...................... 10 2004 056 223

(51) Int. Cl.
*F03D 9/00* (2006.01)
*H02P 9/04* (2006.01)

(52) U.S. Cl. ...................... 700/287; 700/286; 700/290; 290/44; 290/55; 703/2; 703/13; 703/23

(58) Field of Classification Search ................ 700/286, 700/287, 290; 290/44, 55; 703/1, 2, 6, 7, 703/13, 23; 322/17, 44

See application file for complete search history.

(56) References Cited

OTHER PUBLICATIONS

Hooft; Verbruggen; Schaak; Engelen, "Real Time Process Simulation for Evaluation of Wind Turbine Control Systems", Jun. 2003, ECN Wind Energy, http://www.ecn.nl/docs/library/report/2003/rx03043.pdf.*

ECN, "Report ECN WIND", Jun. 2003, ECN Wind Energy, http://www.ecn.nl/library/reports/2003e/rx03043.html.*

Hand; Johnson; Fingersh; Wright, "Advanced Control Design and Field Testing for Wind Turbines at the National Renewable Energy Laboratory", May 2004, NREL, http://www.nrel.gov/docs/fy04osti/36118.pdf.*

Hansen; Jauch; Sorensen; Iov; Blaabjerg, "Dynamic wind turbine models in power system simulation tool DIgSILENT", Dec. 2003, Riso Natinal Labortory, http://www.digsilent.de/Software/Application_Examples/ris-r-1400.pdf.*

* cited by examiner

*Primary Examiner*—Leo Picard
*Assistant Examiner*—Charles Kasenge
(74) *Attorney, Agent, or Firm*—Vidas, Arrett, Steinkraus

(57) ABSTRACT

A method for a functional test of a wind turbine generator plant which comprises the following procedural steps: a control unit for the wind turbine generator plant reads in actual values from at least one structural part of the wind turbine generator plant and generates control signals for actuators of the wind turbine generator plant, a simulation unit has at least one input and at least one output as well as one or more mathematical models which depict the behaviour of one or more structural parts of the wind turbine generator plant, the control signals are applied to the input of the simulation unit and the modeled actual values of the models on the structural parts are applied to the output of the simulation unit, wherein the actual values of the simulation unit are applied to the input of the control unit and the control signals of the control unit are applied to the input of the simulation unit; the simulation unit models the actual values of the structural parts resulting for the control signals applied, for certain initial conditions.

9 Claims, 3 Drawing Sheets

DEVICE AND METHOD FOR A FUNCTIONAL TEST OF ONE WIND TURBINE GENERATOR PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a device and method for a functional test of one wind turbine generator plant and a wind power system.

Wind turbine generator plants, particularly plants whose power is several megawatts, are provided with a complex control and regulation nowadays. Apart from having the individual assemblies comprised in the wind turbine generator plant which, in turn, themselves constitute complex systems the wind turbine generator plants include a sophisticated control software. The control determines how to operate the wind turbine generator plant, which operating conditions are admissible, which events and states are faulty, and the way the system reacts to such faults. In addition to providing operational safety and smooth operation of the wind turbine generator plant, a centralized function of the control software is to optimize the wind yield and service life of the system. Various approaches for checking the control are known. One of those approaches is a formal verification of the control process during which both control functions and control algorithms are formalized and are depicted onto interpreted Petri nets or by Net Condition/Event Systems, for example. Verification is then performed by analyzing the nets or systems. Such verification techniques are suitable, in particular, to discover non-satisfied switching conditions, contradictions in the flow of control, and non-determined control conditions.

Another approach which can be chosen to complete the verification of the control consists in testing the control. What is understood by testing here is to allow the control software to run under certain conditions, the aim being to detect errors.

Wind turbine generator plants, as complex systems, not only imply the need to make a functional test of the control, but also that for an appropriate functional test for the sub-systems of the wind turbine generator plant. The plants specifically include the rotor, transmission, generator, pitch system, azimuthal system, mechanical braking system, and hydraulic system. Those plants also imply the need to test the functionality of individual plants for specific purposes. What is specifically necessary for wind power systems is a functional test of the wind power system control and regulation in an interaction with all wind turbine generator plants comprised in the wind power system, operating equipment such as transformers, cables or overhead power lines, as well as the medium-voltage and high-voltage switchgears at the network junction point of the wind power system.

It is the technical object of the invention to provide a method of a functional test for a wind turbine generator plant or for a wind power system which allows to reliably test the system control.

BRIEF SUMMARY OF THE INVENTION

The inventive method operates with a control unit and at least one simulation unit. The control unit is intended to control the operation of a wind turbine generator plant and reads in actual values from at least one structural part of the wind turbine generator plant and generates control signals for at least one actuator of the wind turbine generator plant. The simulation unit has at least one output and at least one input as well as one or more mathematical models which depict the behaviour of one or more structural parts of the wind turbine generator plant. Mathematical models, in the widest sense, also comprise analytical and physical patterns that produce numerical values as a resultant quantity. Control signals are applied to the input of the simulation unit and the actual values of structural parts of the wind turbine generator plant that are simulated by the models are applied to the output. Both the simulation unit and control units are coupled to each other in such a way that the actual values from the simulation unit are applied to the input of the control unit and the control signals from the control unit are applied to the input of the simulation unit. While the inventive method is being executed the simulation unit for certain initial conditions models the actual values of the structural parts that result for the control signals applied. In the inventive method, the simulation unit takes the place of the wind power system equipped with sensors and actuators for a control. The present method allows for a rapid and reliable functional test of a control for a wind turbine generator plant. This considerably reduces the amount of time required for putting the wind power system into service since the control test of the system may be performed separately. Likewise, the times for developing modifications for the system or control will be decreased. Moreover, this way permits to play over scenarios which cannot be tested on a real wind turbine generator plant for reasons of safety or even are not feasible technically.

In a preferred aspect, the simulation unit is capable of generating the actual values for the wind turbine generator plant in correspondence to the control signals applied, in real time. That is, the actual values provided by the simulation unit not only match the values really encountered at the wind turbine generator plant in their values, but also in their course over time.

Wind turbine generator plants will not work under constant environmental conditions, but are exposed to varying meteorological conditions involving differences in the temperature, wind speed, and wind direction. In a preferred aspect, the simulation unit models the behaviour of the structural part(s) for externally predetermined parameters. It is also possible here to use externally predetermined time sequences for the parameters. Thus, for instance, it becomes possible to predetermine a wind speed increasing in time or an air density varying in time to enable testing the respective behaviour of the control for this phenomenon. In another preferred aspect which may be employed alternatively or in addition to determining external parameters, the simulation unit models the behaviour of structural parts for predetermined actual values of predetermined typical profiles of actual values. For example, this allows to simulate the system behaviour for a constant number of revolutions, a constant load or other predetermined parameters. In particular, if an error occurs on the wind turbine generator plant it is possible here to analyze it more thoroughly.

In an appropriate further aspect of the inventive method, the simulation unit has a rotor model which determines the rotor torque depending on the tip speed ratio and the actual value for the pitch angles. The rotor speed is determined subsequently in dependence on the torque balance on the rotor shaft and the mass moment of inertia of the rotor.

The inventive object is also attained by a device for implementing the method according to any one of the preceding claims. In the device, the simulation unit has a data processing device which possesses a port for the control unit to couple inputs and outputs of the control unit for the wind turbine generator plant to the simulation unit. It is preferred that the simulation unit has ports for being coupled to a control unit integrated in the wind turbine generator plant.

The technical object is also achieved by a method for a functional test of several wind turbine generator plants installed together in a wind power system. The inventive method also provides for a simulation unit and a control unit. The simulation unit has a model for the transmission characteristics of all electrical operating equipment of the electric mains in a wind power system and further has models for the electrical characteristics of wind turbine generator plants which are connected to the electric mains in the wind power system. The control unit for the electric mains in the wind power system reads in actual values for the electrical conditions of the wind power system at the point of transfer between the wind power system and the electric mains and generates control signals for the electrical operating equipment of the wind turbine generator plants in the wind power system. In the inventive method, the simulation unit models the actual values of the electrical conditions of the wind turbine generator plant and electric mains of the wind power systems that result when control signals are applied, for certain initial conditions. The control unit provided may be a so-called wind power system management which attempts to achieve the desired electrical characteristics for the wind power system by accessing the electrical operating equipment for the individual wind turbine generator plants.

BRIEF DESCRIPTION OF THE SEVERAL VIEWS OF THE DRAWINGS

The present invention will be described in more detail below with reference to several embodiments. In the drawings.

DETAILED DESCRIPTION OF THE INVENTION

Figure 1:
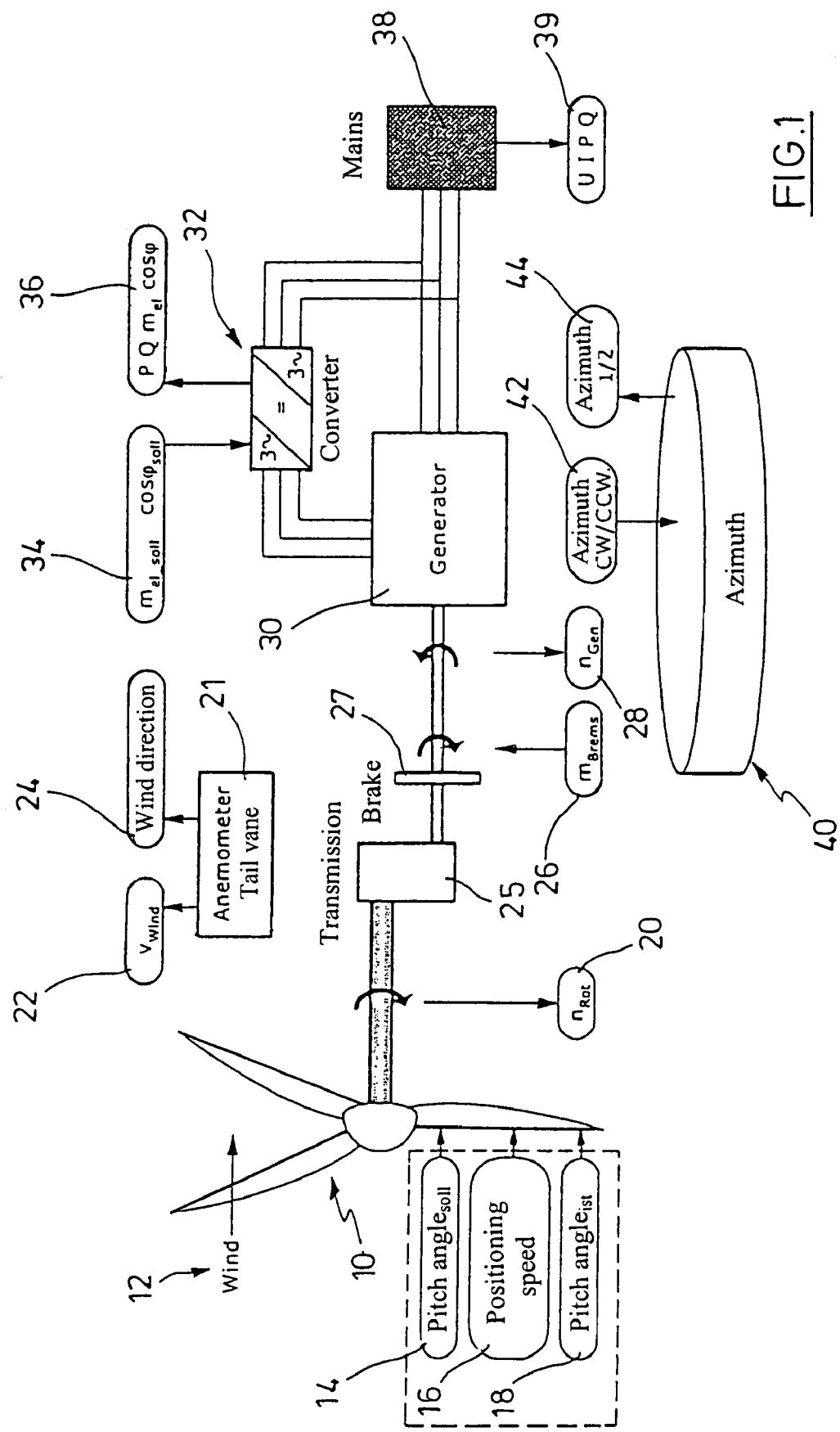
FIG. 1 shows the schematic structure of a wind turbine generator plant including the actual values and control signals used for the method.

While this invention may be embodied in many different forms, there are described in detail herein a specific preferred embodiment of the invention. This description is an exemplification of the principles of the invention and is not intended to limit the invention to the particular embodiment illustrated FIG. 1 schematically shows the structure of the wind turbine generator plant with a rotor 10 to which a flow of air 12 is directed. The rotor has a so-called pitch system by means of which each individual rotor blade is adjustable about its longitudinal axis. This changes the angle of attack to the rotor blade and, thus, the torque acting on the rotor blade. Not only can the pitch angle be predetermined as a setpoint for the pitch system, but the positioning speed 16 can be preset as a control signal in the pitch system as well. The actual pitch angle 18 is the real value for the pitch system. The pitch system offers itself for being depicted, with its actual values and control signals, as a model in the simulation unit. This can also take account of further parameters, e.g. vibrations in the rotor blade, inertia, expansion of volume, and similar phenomena to allow modeling the real behaviour of the pitch system.

Another relevant parameter which also needs consideration within a control and is modeled by the simulation unit is the number of revolutions 20 on the transmission input shaft in the case that a transmission is provided. A further centralized parameter, apart from the rotor speed, is the rotor torque (not shown in the drawing). The rotor torque is physically dependent on the wind, blade angle, and number of revolutions. A precise analysis will reveal that there are more dependence factors, e.g. the rotor blade profile, surface finish of the rotor blades, rotor blade dynamics, height profile of a wind field, action of the centrifugal force, tower circumfluence, rotor blade excitation by gravity, forces acting in azimuthal adjustments, wind turbulences and gusts as well as flow separations on the blade. Such parameters can be taken into account individually or in combination, which depends on the existing model accuracy and desired model profoundness. Here, it is necessary to take into consideration the parameters detected by the wind sensors (anemometer and tail vane) 21 for the wind speed 22 and wind direction 24 as the actual values detected. The parameters 22 and 24 are external parameters which are not influenced by the wind turbine generator plant and the control thereof, but are taken into account by the simulation unit as externally preset values.

A transmission 25 which possibly is present is followed, as the transmission output shaft, by the generator input shaft which is fitted with a brake 27. The brake is actuated via a retarding torque 26 which leads to a generator speed 28. Again, the torque applied to the generator 30 may also be regarded here in lieu of the generator speed.

For example, the control signals possessed by the electrical operating equipment including the converter 32 are a predetermined power factor $\cos \phi_{soll}$ and a setpoint for the generator torque $m_{el\ soll}$ which is produced electrically. The actual values detected for the converter via a model of the electrical operating equipment are the active power P, the reactive power Q, the factor $\cos \phi$ which is achieved, and the torque which really is produced electrically on the generator $m_{el}$. The control signals are designated 34 while the resultant actual values are indicated by 36. Still further, a model for the mains connection 38 may be predetermined which outputs the actual values 39 which are the voltage U, current I, and the active and reactive powers P, Q.

A model for the azimuthal system 40 may be provided in addition to the prescribed parameters. The azimuthal system has controlled drives. The ring gear of the azimuthal system has disposed thereon two inductive proximity switches which emit a signal each whenever a tooth is close to the switch, and emit a zero when the proximity switch points to a gap between teeth. The determination of the actual angular position is made with the aid of the proximity switches the signals of which are referred to as azimuth ½ at 44. As the input parameter, the azimuthal system receives the selected sense of rotation 42 by the signals CW (clockwise) or CCW (counter-clockwise).

Figure 3:
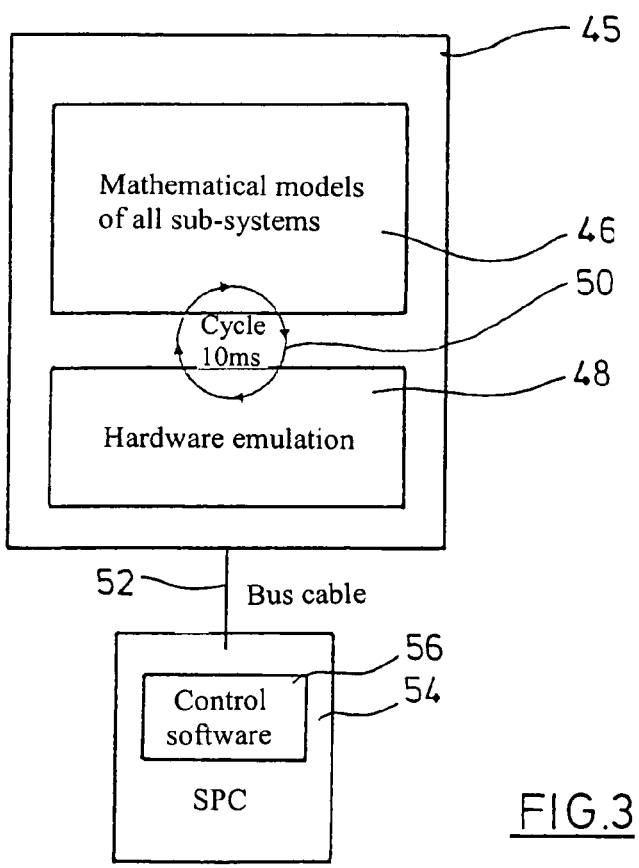
FIG. 3 shows the schematic structure of the simulation unit for the functional test of a wind turbine generator plant.

In the inventive method, as is depicted in FIG. 3 now, the foregoing models with their actual values and control signals are summarized differently and depicted mathematically. The models depicted are summarized within the simulation unit 45. The simulation unit 45 possesses mathematical models 46 which describe the behaviour of the sub-systems depending on the desired complexity. Those models need not necessarily exist as analytical patterns, but it is also sufficient for the invention that the simulation unit operates with simplified models or even with characteristic maps and/or characteristic lines from measurements. The simulation unit 45 further has a hardware emulation 48 which exchanges data with the models for the sub-systems. Depending on the complexity of the systems, it will be possible to achieve an exchange time of 10 milliseconds, for example. The simulation unit 45, which now models the actual values produced in the system, routes them on to a control unit 54 via a bus port 52. A control software 56, which is also employed in controlling a non-simulated wind turbine generator plant, is executed within the control unit 54.

Figure 2:
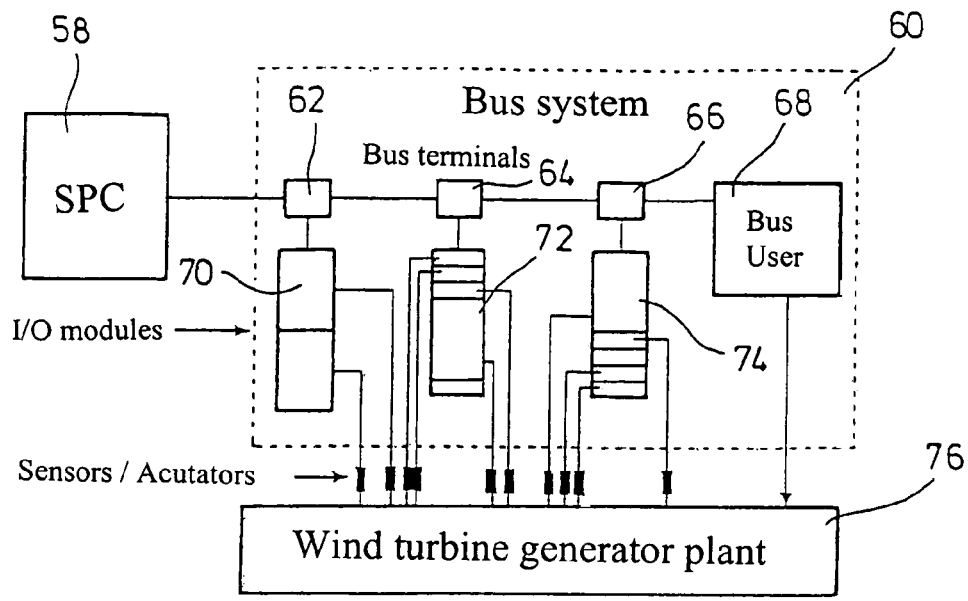
FIG. 2 shows the schematic structure of the unit for the functional test.

It is preferred here to utilize the WinMOD program as a platform for the simulation program. The simulation unit 45 then simulates the physical behaviour of the wind turbine generator plant closely to reality and under real-time conditions so as to test the characteristics of the control system 54 which has a control software and a stored-program control (SPC). The inventive method can also be explicated in FIG. 2. A control 58 controls individual components 62, 64, 66, and other bus users via a bus system 60. The sub-systems communicate with sensors and actuators of the wind turbine generator plant 76 via individual I/O modules 70 to 74. The inventive method now replaces the wind turbine generator plant 76 with a simulation unit which simulates the signals of the sensors and the behaviour of the system onto the actuators. This allows to test the control unit very precisely, and under real-time conditions if the simulation unit is designed accordingly. Likewise, if errors or a faulty behaviour exist the behaviour of the control can be tested in definite situations by appropriately triggering operating conditions with the simulated actual values.

Figure 4:
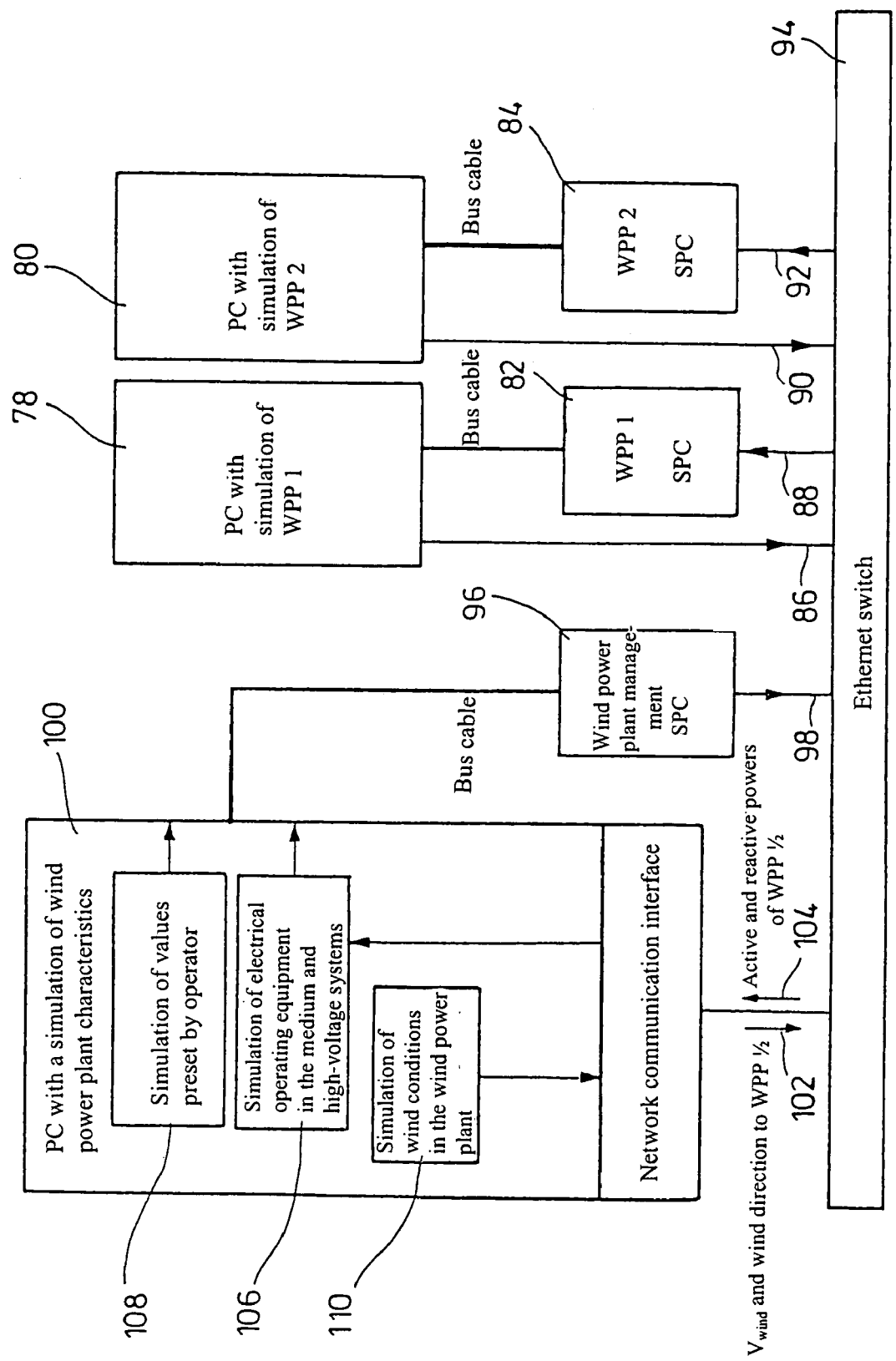
FIG. 4 shows the structure for a functional test in a wind power system having several wind turbine generator plants.

FIG. 4 shows an embodiment of the inventive method in which a wind power system is simulated. The method involves simulating the electrical operating equipment of the wind power systems in individual simulation units including the associated control units 82 and 84. The individual components 78 and 80, along with the signals 86 and 90, generate the actual values for the electrical operating equipment, which are sent on to an Ethernet switch 94. The Ethernet switch 94 enables the controls 82 and 84 to receive control signals 88, 92 for the operation of the wind turbine generator plant. The control signals for the individual wind turbine generator plants are generated by a control unit 96 which assumes the function of a wind power system manager via the higher-rank control of the individual wind turbine generator plants. The control signals of the control unit 96 are sent on to the Ethernet switch 94. Several sub-steps are performed in the simulation unit 100. On one hand, the simulation unit 100 predetermines the wind speed and wind direction as data 102 which is available from the Ethernet switch 94. The input value to the simulation unit is formed by the active and reactive powers 104 and more electrical state variables of the individual wind turbine generator plant. The input values are processed within the close-up simulation of the electrical operating equipment in the medium-voltage and high-voltage networks of the wind power system 106. Here, the networks also take into account electrical load and fault events, the behaviour of the medium-voltage and high-voltage switchgears and, via 108, also the preset values of the mains operators. The behaviour of the aforementioned switchgears also includes the behaviour of the protective relays, circuit interrupters, burglary alarms, kWh and kVArh counters, and the automation unit that possibly are located there, and any compensation units for electric reactive power that possibly exist. Likewise, a simulation 110 for the wind and sun position conditions in the wind power system can follow in the simulation unit 100. For example, this also allows to take into account the topology for the installation of the individual wind turbine generator plants and for the wind power system, to test how well the needs preset by the mains operators can be met in case of varying topologies altogether, on one hand, and how wind turbine generator plant cut-offs caused by shadow-casting scenarios make themselves felt, on the other.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the functional test of one wind turbine generator plant which comprises the following procedural steps: a control unit (54) for the wind turbine generator plant reads in actual values from at least one structural part of the wind turbine generator plant and generates control signals for actuators of the wind turbine generator plant, a simulation unit (45) has at least one input and at least one output as well as one or more mathematical models which depict the behaviour of one or more structural parts of the wind turbine generator plant, the control signals are applied to the input of the simulation unit and the modeled actual values of the models for the structural parts are applied to the output of the simulation unit, wherein the actual values of the simulation unit are applied to the input of the control unit and the control signals of the control unit are applied to the input of the simulation unit; the simulation unit models the actual values of the structural parts that result for the control signals applied, for certain initial conditions, the certain initial conditions being the actual values from at least one structural part of the wind turbine generator plant, the simulation unit generates the actual values in real time for the control signals applied, wherein the simulation unit further has a hardware emulation which exchanges data with the mathematical models of the structural parts of the wind turbine generator plant.

2. The method according to claim 1, characterized in that the simulation unit models the behaviour of the structural part(s) for externally predetermined parameters.

3. The method according to claim 2, characterized in that time sequences are used for the externally predetermined parameters for the externally predetermined marginal conditions.

4. The method according to claim 1, characterized in that the simulation unit is designed to model the behaviour of the structural parts for predetermined actual values or predetermined typical profiles of actual values.

5. The method according to claim 1, characterized in that the simulation unit has a rotor model which determines the rotor torque depending on the tip speed ratio and the actual value for a pitch angle.

6. The method for implementing the method according to claim 1, characterized in that the simulation unit has a data processing device which possesses a port for the control unit to couple inputs and outputs of the control unit to the simulation unit.

7. The method according to claim 6, characterized in the simulation unit has ports for being coupled to a control unit integrated in the wind turbine generator plant.

8. A method for a functional test of several wind turbine generator plants installed together in a wind power system, which comprises the following procedural steps: a simulation unit has a model for transmission characteristics of electrical operating equipment of a voltage network in the wind power system and further has models of the electric characteristics of the individual wind turbine generator plants which are coupled to the voltage network in the wind power system, a control unit for the electric mains in the wind power system reads in actual values for the electrical conditions of the individual wind turbine generator plants and generates control signals for the electrical operating equipment of the individual wind turbine generator plants in the wind power system, wherein the simulation unit models the actual values of the electrical characteristics which result when control signals are applied, for certain initial conditions, the certain initial conditions being the actual values for the electric conditions of the individual wind turbine generator plants.

9. A method for the functional test of a wind turbine generator plant, comprising the steps of:
   reading in actual values from at least one structural part of the wind turbine generator plant using a control unit (54);
   generating control signals for actuators of the wind turbine generator plant, using the control unit;
   providing a simulation unit (45) having at least one input and at least one output as well as one or more mathematical models which depict the behaviour of one or more structural parts of the wind turbine generator plant;
   applying the control signals to the input of the simulation unit;
   applying the modeled actual values of the models for the structural parts to the output of the simulation unit;
   applying the actual values of the simulation unit to the input of the control unit, wherein the actual values of the simulation unit are generated in real time;
   applying the control signals of the control unit to the input of the simulation unit, and
   modeling the actual values of the structural parts that result for the control signals applied, for certain initial conditions, the certain initial conditions being the actual values from at least one structural part of the wind turbine generator plant, using the simulation unit, wherein the simulation unit further has a hardware emulation which exchanges data with the mathematical models of the structural parts of the wind turbine generator plant.

* * * * *